United States Patent [19]

Rebentisch

[11] Patent Number: 4,784,552
[45] Date of Patent: Nov. 15, 1988

[54] NUTS FOR CHANNELED STRUCTURAL MEMBERS

[75] Inventor: Hugo E. Rebentisch, Garden City, Mich.

[73] Assignee: Unistrut International Corp., Wayne, Mich.

[21] Appl. No.: 597,811

[22] Filed: Apr. 9, 1984

Related U.S. Application Data

[63] Continuation of Ser. No. 344,424, Feb. 1, 1982, abandoned.

[51] Int. Cl.[4] .............................................. F16B 37/00
[52] U.S. Cl. ...................................... 411/85; 403/348; 403/405.1; 411/104
[58] Field of Search ..................... 411/84, 85, 87, 88, 411/104, 119, 120, 171, 179; 403/348, 405, 407

[56] References Cited

U.S. PATENT DOCUMENTS 2,676,680  4/1954  Kindorf.
2,696,139  12/1954 Attwood.
3,049,161  8/1962  Attwood.
3,053,355  9/1962  Attwood.

FOREIGN PATENT DOCUMENTS 666234  7/1963  Canada.

Primary Examiner—Lloyd A. Gall
Attorney, Agent, or Firm—Gifford, Groh, VanOphem, Sheridan, Sprinkle and Dolgorukov

[57] ABSTRACT

A special nut is used for affixing parts to a channeled structural member. The nut has an improved positioning means protruding from the top surface of the nut for properly positioning the nut in the channel member.

4 Claims, 2 Drawing Sheets

NUTS FOR CHANNELED STRUCTURAL MEMBERS

This is a continuation of application Ser. No. 344,424, filed Feb. 1, 1982, now abandoned.

FIELD OF THE INVENTION

This invention relates to nuts primarily for a specific use but capable of a more general use. More particularly, this invention relates to a nut intended for securing fittings or other items to be channeled structural members.

BACKGROUND OF THE INVENTION

A known channeled structural member consists of a rectangular metal member having in one face a longitudinal slot bordered by inwardly projecting flanges. In the use of this channeled structural member, fittings of various kinds are secured to the slotted face by arranging within the channel a nut adapted to cooperate with a screw or bolt passing through the fitting and into the nut.

One form of nut used for this purpose, described in U.S. Pat. No. 2,696,139 of Attwood, is provided with grooves equispaced with the inturned flanges of the above-mentioned channel and provided with teeth in the grooves. The nut is also provided with a spring to hold the nut against the channel flanges prior to affixing parts to the channel member. A variation is described in U.S. Pat. No. 3,049,161 of Attwood. This variation has teeth in a groove on one side of the nut surface and a sharp edge on the other side thereof. U.S. Pat. No. 3,053,355 of Attwood describes a nut with sharp edges on both sides of the nut for gripping the channel flanges, but has no provision for properly positioning the nut in the channel member. Other references which disclose nuts for securing parts to channel members are U.S. Pat. No. 3,483,910 of LaLonde et al., U.S. Pat. No. 3,493,025 of LaLonde et al., U.S. Pat. No. 4,146,074 of Kowalski, and U.S. Pat. No. 4,285,379 of Kowalski.

OBJECTS OF THE INVENTION

It is an object of the present invention to provide an improved nut for affixing parts to a structural member.

It is another object of this invention to provide an improved nut for affixing parts to a channeled structural member having an improved positioning means.

Further and other objects of the present invention will become apparent from the description contained herein.

SUMMARY OF THE INVENTION

In accordance with the present invention, a new and improved nut in combination with a channeled structural member used for affixing parts to a structural member, having a top portion, and a longitudinal slot in the top portion. The longitudinal slot bordered by inwardly projecting flanges. The top portion has an inside surface and an outside surface. The bottom portion has an inside surface and an outside surface. The two side portions each have an inside surface and an outside surface, and the inwardly projecting flanges each have an inside surface and an outside surface. The nut comprises a metal plate having a length relatively long compared to its width and having opposite parallel longitudinal side surfaces and end surfaces at an inclined angle to the side surfaces. The nut has one major face and an opposite major face substantially perpendicular to the side surfaces. The nut has a centrally located tapped opening and has parallel sharp edges on the long sides of the one major face for engaging the inwardly projecting flanges of the structural member. The nut has a positioning means protruding from and end surface of the major face for properly positioning the nut with respect to the structural member. The positioning means is spaced from the inside surfaces of the top portion, the bottom portion, and the two side portions of the channeled structural member.

For a better understanding of the present invention, together with other and further objects, advantages and capabilities thereof, reference is made to the following disclosure and appended claims in connection with the above-described drawings.

DETAILED DESCRPITION OF THE PREFERRED EMBODIMENTS

Figure 1:
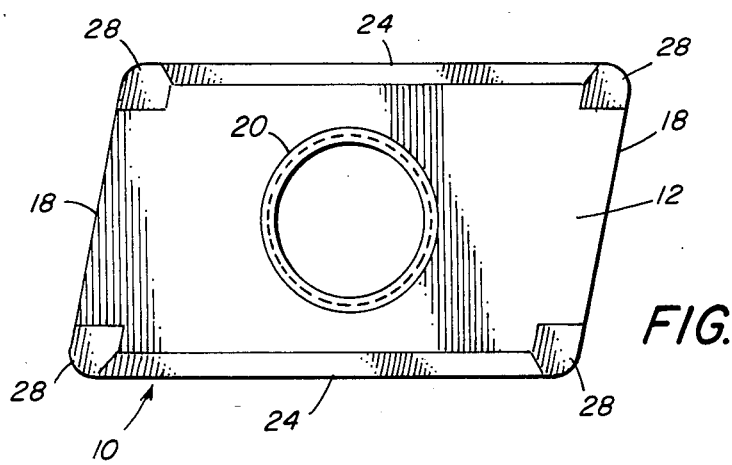
FIG. 1 is an illustrative top view of a nut.
Figure 2:
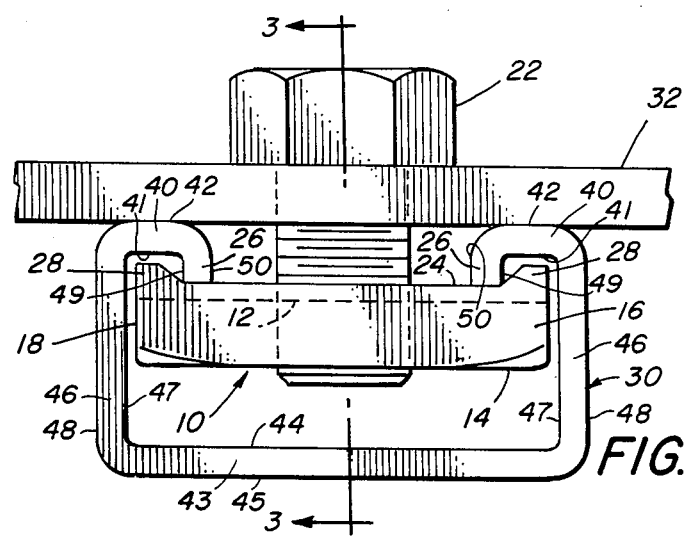
FIG. 2 is an illustrative view, partly in section, showing the position of the nut illustrated in FIG. 1 in a channel member.
Figure 3:
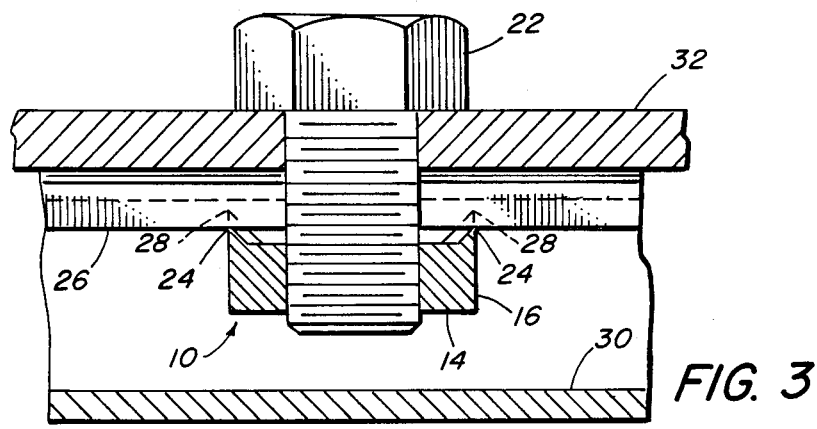
FIG. 3 is an illustrative cross sectional view along line 3—3 of FIG. 2.

Referring now to the drawings with greater particularity, there is shown in FIG. 1 a top view of a nut 10 made from a metal plate having a major face 12, an opposite major face 14 shown in FIG. 2 and FIG. 3, and opposite parallel longitudinal side surfaces 16 shown in FIGS. 2 and 3. The nut 10 has end surfaces 18 shown in FIG. 1 which are at an inclined angle to the side surfaces forming rhomboidal shaped major faces 12, 14. The nut 10 has a centrally located tapped opening 20 for receiving a threaded bolt 22 shown in FIG. 2. The nut 10 has two parallel sharp edges 24 located on the long sides of the one major face 12 shown in FIG. 1 for engaging flanges 26 shown in FIG. 2 by gripping or biting into the flanges 26 with the sharp edges 24 illustrated in FIG. 2 and FIG. 3. The sharp edges 24 provide an improved gripping power preventing slipping of the nut 10 and the bolt 22 under load.

The nut 10 has positioning means, more specifically protrusions 28, which protrude from the short side surface of the one major face 12 a shown in FIG. 1 for properly positioning the nut 10 with respect to a structural member 30 shown in FIG. 2 and FIG. 3. The structural member 30 has a top portion 40, a bottom portion 43, and two side portions 46. The top portion 40 has an inside surface 41 and an outside surface 42. The bottom portion 43 has an inside surface 44 and an outside surface 45. The two side portions 46 each have an inside surface 47 and an outside surface 48 and the inwardly projecting flanges 26 each have an inside surface 49 and an outside surface 50. The protrusions 28 can be located at one or more of the corners of one major face 12 at which the angle made by one of the side surfaces 24 and one of the end surfaces 18 is acute. Alternatively, the protrusions 28 can be located from each of the corners of one major face 12 as illustrated in FIG. 1. The protrusions 28 keep the nut 10 properly positioned across the channel. These protrusions are an improvement over the previous nut described in U.S. Pat. No. 3,053,355 of Attwood, which has no positioning means to maintain proper position of the nut in the channel member.

The protrusions prevent the nut 10 from turning in the channel while loosening the nut 10 and the bolt 22 whenever repositioning a part 32 shown in FIG. 2 and FIG. 3.

Figure 4:
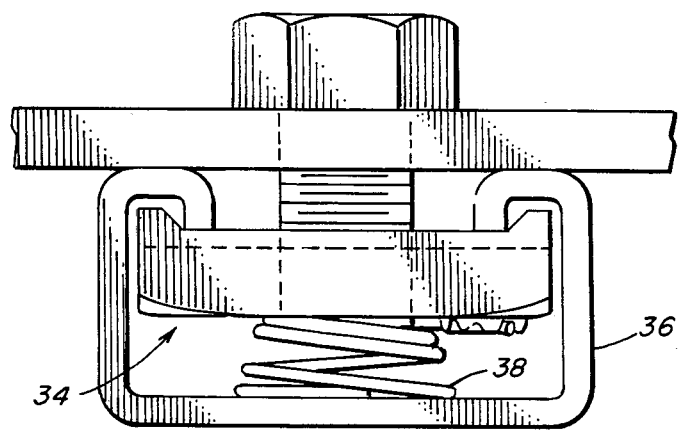
FIG. 4 is an illustrative view, partly in section, showing a modification of the nut illustrated in FIG. 2 with a spring attached positioned in a channel member.

FIG. 4 shows a modification of the nut 10 illustrated in FIG. 2 positioned in a structural member 34. A modified nut 36 has a spring 38 attached as described in copending patent application, Ser. No. 344,424 filed concurrently herewith and assigned to the assignee of the present invention.

While there has been shown and described what is at present considered the preferred embodiments of the invention, it will be obvious to those skilled in the art that various changes and modifications may be made therein without departing from the scope of the invention as defined by the appended claims.

What is claimed is:

1. A nut in combination with a channeled structural member for affixing parts to said channeled structural member, said channeled structural member having a top portion, a bottom portion, two side portions, and a longitudinal slot in said top portion, said longitudinal slot bordered by inwardly projecting flanges, said top portion having an inside surface and an outside surface, said bottom portion having an inside surface and an outside surface, said two side portions each having an inside surface and an outside surface, and said inwardly projecting flanges each having an inside surface and an outside surface, said nut comprising a metal plate having a length relatively long compared to its width and having opposite parallel longitudinal side surfaces and end surfaces at an inclined angle to said side surfaces, said nut having one major face and an opposite major face substantially perpendicular to said side surfaces, said nut having a centrally located tapped opening, said nut having parallel sharp edges on the long sides of said one major face for engaging said inwardly projecting flanges of said channeled structural member, and having positioning means protruding from an end surface of said one major face for properly positioning said nut with respect to said structural member; said positioning means being spaced from said inside surfaces of said top portion, said bottom portion, and said two side portions of said channeled structural member.

2. A nut according to claim 1 wherein said positioning means includes a protrusion protruding from said one major face of said nut, said protrusion being located at a corner of said one major face at which the angle made by one of said side surfaces and one of said end surfaces is acute.

3. A nut according to claim 1 wherein said positioning means includes a protrusion protruding from each of the corners of said one major face.

4. A nut according to claim 1 wherein said positioning means includes a protrusion protruding from an end surface of said one major face.

* * * * *